Jan. 6, 1931.  E. C. DEMPSEY  1,788,280
AUTOMATIC SHUT-OFF VALVE FOR OIL TANKS
Filed Nov. 21, 1929
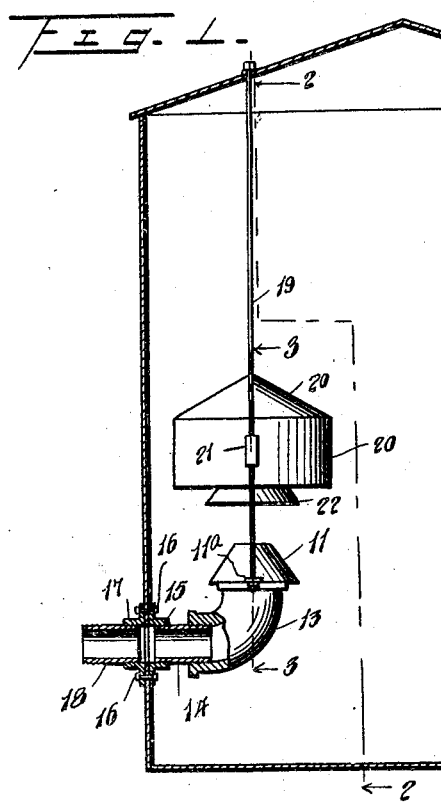
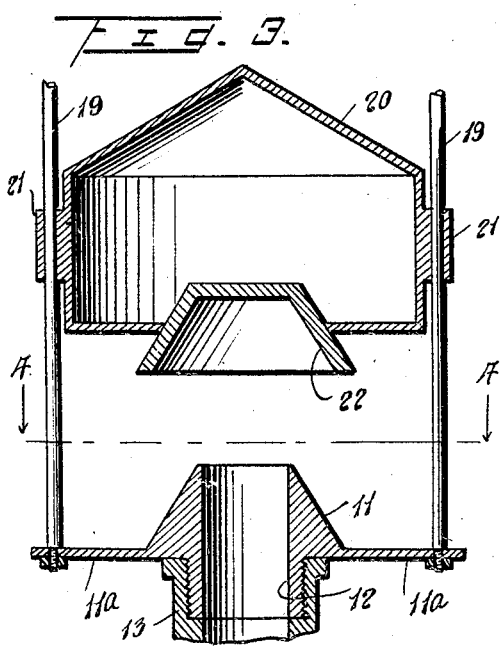
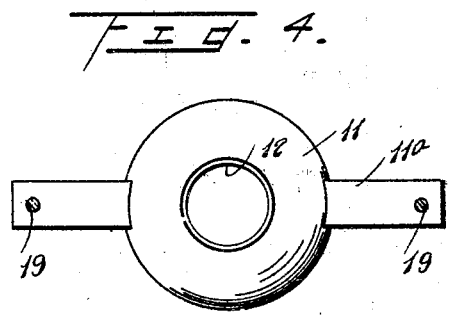
Inventor
E. C. Dempsey.
By
Attorney Patented Jan. 6, 1931

1,788,280

UNITED STATES PATENT OFFICE

EDWARD C. DEMPSEY, OF WINK, TEXAS, ASSIGNOR, BY DIRECT AND MESNE ASSIGNMENTS, OF ONE-FOURTH TO GROVER C. MITCHELL, OF WINK, TEXAS, AND ONE-FOURTH TO E. M. HAMMER, OF WINKLER COUNTY, TEXAS

AUTOMATIC SHUT-OFF VALVE FOR OIL TANKS

Application filed November 21, 1929. Serial No. 408,866.

This invention relates to an automatic shut-off valve for oil tanks or the like.

In the handling of oil by the pipe line method, it is imperative to place more than one tank on the suction lines to the pumps at a time. Since the tanks vary in size and elevation, and hence do not fill and empty at the same time, the action causes them to fill the line to the pump with air which in turn causes the engines and pumps to race, resulting in injury and causing large repair bills. If the pumps still run, they do not pump at maximum efficiency or capacity and a waste of time and power results. The present invention is provided primarily to overcome the objections noted.

In accompanying drawings, one operative embodiment is shown and therein

Figure 1 is a fragmentary sectional view of a tank, showing the improved shut-off valve in position, Figure 2 is a fragmentary sectional view on a plane indicated by the line 2—2 of Figure 1, Figure 3 is a sectional view on a plane indicated by the line 3—3 of Figure 1, and Figure 4 is a cross sectional view taken on the line 4—4 of Figure 3.

Referring specifically to the drawings, 10 designates a conventional tank which is adapted to be in communication with a pipe line and to hold oil. The outlet of the tank is equipped with a valve seat member 11 having an externally screw threaded reduced nipple 12 engaging in an angular coupling 13 secured to a pipe section 14 secured to a flanged nipple 15 secured to the side wall of tank 10 and enclosing an opening 16 in the tank, 17 indicating another nipple secured to the outer side of the tank wall to which the outflow pipe 18 is connected. Valve seat member 11 has laterally extending straps or lugs 11ª to which are secured spaced rod or bolts 19 disposed vertically in the tank and fastened in liquid-tight relation to the top wall thereof.

A float, which may be a round or other shape, and hollow, and formed of copper or other material, 20 is equipped with integral guides 21 slidably mounted on the rods 16.

Carried by the bottom wall of the float 20 is a frusto-conical hollow valve member 22. The valve member is adapted for engagement with the seat member 11 and engaging surfaces are ground so that an effective seat will be obtained.

In the use of a device of this sort, when the tank 10 is filling, the float 17 rises with the oil. However, when the tank is emptied, the valve member 19 engages the seat 11 automatically, thus closing the outlet from the tank so that air cannot reach the pump. The tank 10 may be used with an air-tight cap so as to save the gravity of the oil. Also it will be impossible to collapse a tank equipped with this device by vacuum exerted on the tank by the pump.

Various changes may be resorted to provided they fall within the spirit and scope of the invention.

I claim as my invention:—

In a tank, an outlet member adapted for communication with the suction line of a pump, a conical valve seat member screwed to said outlet having arms integral therewith, rods rising from said arms, a hollow float slidably mounted on said rods, an inverted conical valve carried by the float extending partly into the same and partly below the same whereby the lower edge portion thereof is marginally free, said valve being open at the bottom and adapted to exteriorly telescope over said seat member.

In testimony whereof I affix my signature.

EDWARD C. DEMPSEY.